United States Patent Office 2,693,665
Patented Nov. 9, 1954

2,693,665

PRODUCTION OF MUSHROOM MYCELIUM BY SUBMERGED CULTURE IN A LIQUID MEDIUM

Harry Humfeld, Berkeley, Calif., assignor to United States of America as represented by the Secretary of Agriculture No Drawing. Application January 23, 1948, Serial No. 4,056

16 Claims. (Cl. 47—1.1)

(Granted under Title 35, U. S. Code (1952), sec. 266)

This application is made under the act of March 3, 1883, as amended by the act of April 30, 1928, and the invention herein described and claimed if patented in any country, may be manufactured and used by or for the Government of the United States of America throughout the world for governmental purposes without the payment to me of any royalty thereon.

This invention relates to the utilization of normally valueless waste materials discarded in the food processing industry for the production of valuable foodstuffs. It also relates to the production of mushroom mycelium, a foodstuff, by culturing on media made from agricultural wastes such as pear waste, citrus waste, or asparagus waste or other media.

An object of this invention is to provide processes for producing mushroom mycelium by culturing on suitable media, particularly media made from agricultural wastes, such as citrus waste, pear waste, or asparagus waste.

Another object of this invention is to provide a process for growing mushroom mycelium under aerated, submerged conditions.

Another object of this invention is to provide a process for growing mushroom mycelium under aerated, submerged conditions on a medium made from agricultural waste such as citrus waste, pear waste, or asparagus waste.

Further objects and advantages will be obvious from the description herein.

The inventor has found that mushroom mycelium can be produced by culturing on suitable media, particularly on media made from agricultural wastes such as citrus waste, pear waste, or asparagus waste. The mushroom mycelium, the root-like portion of the mushroom plant, is a valuable food stuff, and tastes like the fruiting-body of the mushroom plant. It can be used for all purposes to which the fruiting-body is adapted. The mycelium is richer in protein than the fruiting-body, being about 50%. Although the mycelium is primarily useful as a human foodstuff it is well adapted to use as an animal feed especially in view of its high protein content.

Heretofore, the only mushroom product available for a foodstuff was the fruiting-body, which is usually cultivated on horse manure compost.

I have found that the rootlike growth or mycelium of the mushroom can be grown in aerated liquid culture. The resulting mycelium may be used as a "spawn" for seeding regular mushroom beds or can be used directly as a food. The mycelium can be used to make soups, gravies, condiments, or as flavoring for many different meats and other dishes.

Analyses were made of commercially available mushrooms (fruiting bodies of *Agaricus campestris*) and of the mycelium of the same species prepared according to this invention. The following results were obtained:

TABLE I

|  | Mushroom (dry basis) | Mycelium (dry basis) |
| --- | --- | --- |
| Protein, Percent | 29.0 | 49.1 |
| Carbohydrates, Percent | 56.5 | 39.5 |
| Fat, Percent | 3.3 | 3.3 |
| Ash, Percent | 10.0 | 8.1 |

The growing of mushroom mycelium in submerged culture has many advantages over the usual methods for growing mushrooms on compost beds. By operating according to this invention there is a considerable reduction in time and expense. Substantial quantities of mycelium can be grown according to my invention in several days while several weeks are required for the conventional technique. The equipment required for the submerged process is much smaller than that required for the usual composting method. The mycelium initially separated from the culture is a cream-like mass which can be handled in tanks, pumps, and pipe lines, so that manual handling is eliminated. Ordinary mushrooms (fruiting-bodies) are fragile and must be handled gently to avoid bruising. In my process no cleaning to remove bits of soil or compost are necessary, nor is stemming required. The mycelium is more uniform in properties since the conditions of growth can be more accurately controlled when using a liquid medium than when growing on a solid compost. When grown on compost, mushrooms must be picked before the cap opens to obtain a light-colored article attractive to the consumer. This fact requires great diligence on the part of the grower. No such factor enters into the culture by the submerged technique.

The following examples illustrate particular modes of culturing the mushroom mycelium, it being understood that these examples are furnished by way of illustration and not limitation.

Example I

A medium was prepared as follows: Pear waste (peels, cores, culls, etc.) was pressed and the juice collected and clarified by treatment with calcium hydroxide and filtration. This juice was diluted with water to a sugar content of 5% and supplemented with inorganic compounds, as follows: To each liter of diluted juice was added 2.5 ml. of 85% phosphoric acid, 0.5 gram potassium sulphate, and 0.2 gram magnesium sulphate. The medium was then sterilized by steam at 100° C. for about a half hour. After cooling sufficient ammonium hydroxide was added to adjust the pH to 6.0.

18 liters of the medium was placed in the sterile fermentor described in the patent application of H. Humfeld, E. Aeschlimann, and J. R. Hoffman, Serial No. 773,722, filed September 12, 1947, Patent Number 2,542,031, issued February 20, 1951, and inoculated with 70 grams (calculated on dry basis) of mushroom mycelium (*Agaricus campestris*). The mycelium was cultured at a temperature of 25° C. with the agitator shaft rotating at about 1725 R. P. M. Air was introduced into the fermentor at the rate of about one volume of air per minute per liter of culture. After culturing for about 6 hours, 150 ml. of urea solution containing 0.25 gram urea per ml. was added. The culturing was continued and after 24 hours, 12 liters of the culture was removed. The removed culture was centrifuged and 590 grams (dry basis) of mycelium was obtained. Twelve liters of fresh medium was added along with 150 ml. of the aforesaid urea solution. The culturing was conducted under the same conditions. At the end of 12 hours after adding the fresh medium, the entire culture was harvested yielding 558 grams (dry basis) of mycelium. Instead of harvesting the entire culture some of the culture may be removed for harvesting and new medium added as set forth above.

The yield in the basis of the sugar consumed was calculated to be 32.8 grams of dry mycelium per 50 grams of sugar or a 64.6% yield for the first 18 liters of medium and 30.3 grams of dry mycelium per 50 grams of sugar or a yield of 60.6% for the subsequent 12 liters of medium.

Example II

The medium used in this experiment was prepared by diluting asparagus juice concentrate (62.5% solids) with water in the proportion of 130 grams concentrate per liter of medium. This medium which had a pH of 4 was sterilized by steaming for 30 minutes. The medium was then cooled and was ready for use.

*Agaricus campestris* was cultured at 25° C. in the asparagus juice medium using a shaking machine. When good growth of the *A. campestris* mycelium had been obtained, the culture was transferred into a sterile fermentor as described in the patent application of H. Humfeld, E. Aeschlimann, and J. R. Hoffman, Serial No. 773,722, filed September 12, 1947, Patent Number 2,542,031, issued February 20, 1951. Sufficient sterile asparagus juice medium was added to bring the total volume to 7.5 liters. The mycelium was then cultured at a temperature of 25° C. with the agitator shaft revolving at about 1725 R. P. M. Air was introduced into the fermentor at the rate of about one volume of air per minute per volume of culture medium. At regular intervals during the culturing, the pH of the culture medium was determined and samples were removed for obtaining the volume of mycelium. The volume of mycelium was determined by centrifuging a sample of the culture The lower layer in the centrifuge tube (the wet mycelium) was then dried in an oven at about 50° C. in order to estimate the yield of dry mycelium. Fresh medium was added from time to time to provide necessary nutrients for growth. In particular, 5 liters of fresh medium was added between the 13th and 23rd hours and 4 liters of fresh medium was added between the 24th and 26th hours.

The following results were obtained:

| Incubation time, Hours | pH | Mycelium Volume, Percent | Volume in Fermentor, liters | Culture Medium added, liters | Yield of Dry Mycelium, grams |
|---|---|---|---|---|---|
| 0 | 4.7 | 1.8 | 7.5 | | 20 |
| 2 | 4.65 | 1.8 | 7.5 | | 20 |
| 4 | 4.6 | 2.5 | 7.5 | | 28 |
| 5 | 4.7 | 3.5 | 7.5 | | 39 |
| 6 | 4.7 | 5.5 | 7.5 | | 62 |
| 7 | 4.75 | 6.0 | 7.5 | | 68 |
| 13 | 4.7 | 11.0 | 7.5 | | 124 |
| 23 | 4.25 | 7.0 | 12.5 | 5 | |
| | 4.5 | 14.0 | 12.5 | | 250 |
| 24 | 4.5 | 15.0 | 12.5 | | 260 |
| 26 | 4.3 | 11.0 | 16.5 | 4 | |
| | 4.15 | 12.0 | 16.5 | | 289 |
| 29 | 4.4 | 15.5 | 16.5 | | 388 |
| 33 | 4.75 | 17.5 | 16.5 | | 421 |

By conducting the incubation for 33 hours a yield of 421 grams of dry cream-colored mycelium (25.5 grams per liter of culture) was therefore obtained.

In this experiment no attempt was made to alter the natural pH of the asparagus juice medium.

In the above example, the asparagus juice concentrate was made in the following manner:

Fresh asparagus butts and asparagus spears (culls) were disintegrated in a hammer mill, the crushed material put through a screw press and the juice collected. This juice was placed in a tank and the pH adjusted to about 5.0 by addition of sulphuric acid. The juice was then stirred for about 4 hours at a temperature of about 50° C. This digestion has the purpose of solubilizing certain nitrogenous materials present in the juices and thus enhances its nutritive value. At the end of the digestion period, the temperature was raised to about 80° C. to coagulate the suspended material. After filtration the juice was evaporated under vacuum to a solids content of 65 to 70%.

It has been found that a suitable medium for the production of mushroom mycelium can be made in this manner. Variations are possible in the process of preparing the juice. In the digestion step the pH can be adjusted with any non-toxic acid such as hydrochloric acid, phosphoric acid, acetic acid, etc. Regardless of what acid is used, the pH should be within the range from about 4.5–5.5. The digestion is best accomplished at 50° but the temperature range from about 40° C. to about 60° C. gives good results. The final heating to coagulate the insoluble material is not critical and any temperature from about 75° C. to about 100° C. is operative. The evaporation to concentrate the juice is only necessary to reduce cost of shipping and prevent spoiling if stored. This step can of course be omitted if desired. Further details as to the preparation of asparagus juice concentrate are disclosed in U. S. Department of Agriculture mimeographed circular A1C-70. Although it is preferred to prepare the asparagus juice by the above technique, it is also possible to use juice which is pressed from asparagus (butts, spears, etc.) without any further treatment.

Many different types of apparatus can be used to carry out the submerged culture. The experiment described in the examples herein were carried out in an apparatus similar to that disclosed and claimed in the said patent application of Harry Humfeld, Ernest Aeschlimann, and John R. Hoffman. This apparatus consists essentially of a large glass jar provided with agitating, aerating, and foam-breaking devices. A shaft rotated by an electric motor extends into the glass jar and is provided at its lower end with a stirring device for drawing air from the atmosphere into the fermentor and then emulsifying it with the medium. The shaft is also provided with several truncated cones which act as agitators. Near its upper end, the shaft is provided with a disc containing vaned openings and a cone directly above this. Foam coming into contact with the disc is caught up by the vanes and whirled into the cone whereby the foam is broken up into gas and liquid. The fermentor is also provided with auxiliary devices such as thermometer, sampling tubes, etc. In operation, the fermentor was placed in a large bath of water maintained at constant temperature.

Many other types of apparatus can be employed. The essentials to be provided are a vessel and means for agitation and means for introducing air during the incubation. Many refinements may be added such as thermometers, heating or cooling jackets, sampling devices, inlets for introducing materials, devices for measuring pH of the culture, and mechanical foam breakers. It is preferable to employ some stirring or agitating device to disperse the air entering the system with the medium. This device may be a mechanical agitator, such as a propeller, for example. However, it is also possible to utilize the air entering the system for agitation as well as for the metabolism of the organism. To this end, air may be introduced through orifices whereby turbulence of the culture medium will be obtained. Another method of providing agitation involves continuously circulating the culture medium through a pump. In such case, the air may be introduced directly into the pump or into the pump line whereby it will be thoroughly dispersed into the culture medium.

During the submerged culturing excessive foaming is sometimes encountered. This can be controlled by lowering the pH, by adding chemical de-foaming agents or by use of mechanical devices. Octadecanol which may be diluted in mineral oil (liquid petrolatum) or lard oil may be used as a chemical de-foaming agent. Mechanical defoaming devices known in the art may be used for mechanical control of foam.

The mushroom mycelium can be cultured on many different media. From an economic standpoint, it is preferable to utilize media prepared from agricultural wastes. Many of such wastes are available in farming communities especially during canning and packing season. For instance, the citrus industry produces enormous volumes of waste material such as orange peels, cull oranges, orange pulp, grapefruit peels, cull grapefruit, grapefruit pulp, and similar wastes from lemons and limes. The pear industry produces waste including peels, culls, and cores. In the canning of asparagus are obtained butts and cull spears. In the growing of melons such as cantaloupes large tonnages of over-ripe and oversize melons are discarded. Apple packers and canners produce quantities of waste including peels, cores, culls, etc. In the same manner, many other wastes are available at low cost, since in most cases the processors are only too glad to get rid of the material. Such wastes contain sugar and some nitrogenous material and mineral salts and thus are admirably adapted for the purpose of this invention. Regardless of what waste is used, it can easily be prepared for use as a medium. To this end the waste is separated from fibrous material to obtain a liquid containing the nutritive elements, the waste being either pressed or subjected to leaching with water. In either case the juice, preferably after clarification, is ready for use. Media may be made by cooking cereals in water to make solutions containing carbohydrates, nitrogen derivatives and mineral salts. Suitable cereals are corn, wheat, rye, oats, barley, malted barley, rice, etc. By-products of sugar refining, such as beet or cane molasses, and corn steep liquor, are also suitable media constituents. In the case of media made from agricultural materials, such as those referred to above, growth can be obtained without addition of mineral salts. If the medium is deficient in such elements as nitrogen, phosphorus, potassium, and magnesium it will be necessary to supplement it with salts of these elements to obtain maximum growth. In essence, any medium can be used which contains water, soluble carbohydrate, a source of nitrogen and mineral salts. The soluble carbohydrate may be starch, sucrose, glucose, maltose, corn syrup, etc. The source of nitrogen may be an inorganic compound such as ammonia, ammonium phosphate, ammonium sulphate, or other ammonium salts, or it may be an organic compound such as urea, ammonium glutamate, glutamic acid or other amino acids, a protein, or a hydrolyzed protein. If desired a "synthetic" medium may be prepared by dissolving a sugar, such as sucrose or dextrose, in water and adding a source of nitrogen such as ammonium phosphate. In cases where the medium is made from individual compounds such as sugars and ammonia derivatives it is necessary to add mineral nutrients. Good results are obtained by adding potassium, magnesium, sulphur, and phosphorus. These elements are added as any soluble salt thereof. Thus potassium phosphate could be used to supply both potassium and phosphorus, magnesium sulphate could be used to supply both magnesium and sulphur. Other soluble salts or derivatives of these elements can obviously be used. One method of growing the mycelium involves use of a medium containing water, dextrose, monosodium glutamate, and mineral salts. The resulting culture, containing a suspension of the mycelium in the culture and containing some unused monosodium glutamate, can be used directly as a soup. It has good flavor and is an excellent food from a nutritional standpoint. For like purposes one can employ other neutral or pleasant tasting media containing the essential ingredients listed above.

The temperature of growth is not critical within a rather wide range, but generally a temperature from about 15° C. to about 35° C. is preferred.

The pH of the culture may be varied over a wide range; excellent growth has been obtained within the range from about 2.3 to about 8.5. However, it is of advantage to carry out the growth at a pH of about 4 to about 5 in order to minimize danger of bacterial contamination. The ordinary types of bacteria which may be present as contaminants will not grow at this pH range. For the proper adjustment of the pH of the medium, any non-toxic, water-soluble basic or acidic material may be used. For instance, to decrease the pH one may use sulphuric acid, sodium bisulphate, hydrochloric acid, acetic acid, phosphoric acid, monocalcium acid phosphate, etc. For increasing the pH, one may employ sodium hydroxide, ammonium hydroxide, sodium bicarbonate, sodium carbonate, etc. Generally, a pH of about 4 to 8 is preferred.

During the submerged culture a substantial amount of air should be introduced as the mycelium requires aerobic conditions for its growth. In the general it has been found that about one volume of air per minute per volume of culture gives good results.

The method of inoculation of the medium and the quantity of inoculum are not critical. The inoculation can be carried on in many ways. One method involves growing a culture of the mushroom mycelium on a wort agar plate. An ordinary mushroom (fruiting body) is sterilized on its surface by an alcohol dip and flaming. Some of the tissue of the mushroom (either spores or fleshy part) is placed on the agar by a stab or scrape technique. After incubating this agar growth at 25° C. until good growth is obtained (about 2 weeks) the colony of mycelium is used to inoculate the sterile medium for the submerged culture. Preferably, however, the colony of mycelium from the agar plate is used to inoculate a small batch of sterile liquid medium and the culturing done in a shaking machine at about 25° C. When good growth is formed, the culture so obtained is used to inoculate larger quantities of sterile medium and further growth is obtained by the shake technique. Finally, this culture is used to inoculate a large sized batch of sterile medium in a fermentor adapted for submerged culture. By building up the concentration of mycelium in this manner more rapid growth is obtained and the large scale equipment is not used until actually necessary. The medium for the submerged culture may also be inoculated by merely adding to it sections of mushroom (spores, fleshy portion of the fruiting body or mycelium). In such case growth will be slower at first than where a mycelium grown in the liquid medium is used for inoculation. The most convenient method of inoculation involves removing a portion of the culture medium from each large scale batch, and preserving it to be used to inoculate the next batch of sterile medium. The culture can be accomplished in a continuous manner if the culture medium is continuously withdrawn at a slow rate while fresh medium is introduced into the fermentor at the same rate.

For maximum yield the culture is harvested at the time when the last part of the carbohydrate material in the medium has been utilized by the organism. This point can be readily ascertained by the pH of the culture beginning to rise due to autolysis of the mycelium. It is, of course, not essential to carry the culturing this far. The culture can be harvested at any time when good yield is present as can easily be determined by centrifuging a sample of the culture, the mycelium being deposited in the lower part of the centrifuge tube and thus separated from the liquid phase.

In order to prevent contamination of the culture by bacteria or yeasts it is essential to sterilize the medium prior to inoculation. This sterilization is accomplished by boiling the medium, by steaming it, or by subjecting it to steam under pressure. If the pH of the medium is 5.5 or less, sterilization can be accomplished satisfactorily by boiling or by passing steam through the material. If the pH is above 5.5, it is advisable to subject the medium to steam under pressure in an autoclave or other pressure-resistant vessel.

The mycelium is recovered from the culture by filtering or preferably by centrifuging and is thus separated as a cream-like material. This wet mycelium is preferably washed with water to remove culture medium. It is then ready for use and can be used as a food or as a flavoring for other foods. If the material is to be kept for any length of time, it may be frozen or canned in the same manner as applied to fruits and vegetables. Likewise the wet mycelium may be dehydrated in which condition it keeps well. For this dehydration, any of the customary drying techniques may be employed. Thus the wet mycelium can be subjected to a draft of heated air while the material is on trays or in a rotary kiln. Drum-drying or spray-drying methods may also be employed. Vacuum apparatus with or without heating may be utilized or the wet mycelium can be dried by merely exposing it to unheated air in the room. As set forth above, the mycelium may be grown on a culture which is of neutral or pleasant taste. In such case the mycelium need not be separated from the culture but the entire culture mass may be used as a soup or after sterilization be canned for use as a soup or a soup stock or flavoring liquid for gravies, etc.

The mycelium prepared according to this invention has numerous uses. It can be used directly as a food or as a flavoring agent. For instance soups of distinctive mushroom flavor can be made by cooking the mycelium with water and a small amount of salt and pepper. If a thicker soup is desired milk may be substituted for the water or one may add a thickening agent such as cornstarch, flour, barley, rice, or potatoes. If a meat-mushroom soup is desired one may add some beef stock, meat extract, monosodium glutamate, or hydrolyzed protein. Excellent gravies may be made in the same manner by adding a larger proportion of thickening agent. The dry mycelium may be mixed with dried vegetables such as celery, onions, or parsley together with a thickening agent and spices and compressed into blocks or tablets which may be utilized as a convenient source for soup. If desired the dry mycelium can be used as a flavoring agent and applied to almost every type of food. For instance, the mycelium can be sprinkled on steaks or added to conventional gravies, roasts, stews, etc. The dry mycelium can be mixed with salt and a small amount of an anti-hygroscopic agent to make a mushroom-flavored salt. The dry mycelium can be compressed by the use of suitable molds in the conventional "toadstool" form to make a simulated mushroom (fruiting-body). Although the primary use of the mycelium is as a human food, the product may be used as an animal feed and also may be used as a "spawn" to inoculate beds for the customary growing of mushrooms (fruit-bodies).

Although the example herein shows the growth of *Agaricus campestris* mycelium, it is obvious that the process can be applied to the culturing of myselium of other types of edible mushrooms using the aerated, submerged technique.

The expression "mushroom tissue" used herein means any portion of the mushroom organism. Thus the term includes spores, the fleshy part of the fruiting body or mycelium. The mushroom may be any of the known edible varieties.

Having thus described my invention, I claim:

1. A process for growing mushroom mycelium, a foodstuff, comprising inoculating a sterile citrus juice medium with mushroom tissue, forcing air into the culture beneath the surface thereof, agitating the culture by stirring to disperse the air into the culture, and continuing growth under agitated, aerated, submerged growth conditions until a substantial amount of mycelium is produced.

2. A process for growing mushroom mycelium, a foodstuff, comprising inoculating a sterile pear juice medium having a sugar content of about 5% with mushroom tissue, forcing air into the culture beneath the surface thereof, agitating the culture by stirring to disperse the air into the culture, and continuing growth under agitated, aerated, submerged conditions until a substantial amount of mycelium is produced.

3. A process for growing mushroom mycelium, a foodstuff, comprising inoculating sterile asparagus juice medium with mushroom tissue, forcing air into the culture beneath the surface thereof, agitating the culture to disperse the air into the culture, and continuing growth under agitated, aerated, submerged conditions until a substantial amount of mycelium is produced.

4. A process for growing mushroom mycelium, a foodstuff, comprising inoculating a sterile, liquid, organic-material containing nutrient medium with mushroom tissue, forcing air into the culture beneath the surface thereof, agitating the culture by stirring to disperse the air into the culture, and continuing growth under agitated, aerated, submerged conditions until a substantial amount of mycelium is produced.

5. A process in accordance with claim 4 wherein the nutrient medium is citrus juice and the mushroom tissue is tissue of *Agaricus campestris*.

6. A process in accordance with claim 4 wherein the nutrient medium is pear juice and the mushroom tissue is tissue of *Agaricus campestris*.

7. A process in accordance with claim 4 wherein the nutrient medium is asparagus juice and the mushroom tissue is tissue of *Agaricus campestris*.

8. A process for growing mushroom mycelium, a foodstuff, comprising establishing a sterile, liquid medium, comprising water, a carbohydrate, and a source of nitrogen, inoculating the medium with tissue of the mushroom, forcing air into the culture beneath the surface thereof, agitating the culture to disperse the air into the culture, and continuing growth under agitated, aerated, submerged growth conditions until a substantial amount of mycelium is obtained.

9. A process in accordance with claim 8 wherein the pH of the culture is maintained in the range from about 4 to about 8.

10. A process in accordance with claim 8 wherein the temperature of the culture is maintained in the range from about 15° C. to about 35° C.

11. A process for growing mushroom mycelium, a foodstuff, comprising establishing a sterile, liquid medium including water, a carbohydrate, and a source of nitrogen, inoculating the medium with a culture of *Agaricus campestris*, forcing air into the culture beneath the surface thereof at the rate of about 1 volume of air per minute per volume of culture, agitating the culture by stirring to disperse the air into the culture to obtain agitated, aerated, submerged growth conditions and continuing growth under agitated, aerated, submerged conditions at a temperature from about 15° C. to about 35° C. and a pH from about 4 to 8 until a substantial amount of the mycelium is produced.

12. A process according to claim 11 wherein the medium is citrus juice supplemented with a source of nitrogen.

13. A process according to claim 11 wherein the medium is pear juice supplemented with a source of nitrogen.

14. A process according to claim 11 wherein the medium is asparagus juice.

15. The process in accordance with claim 4 wherein the nutrient medium contains urea.

16. The process in accordance with claim 4 wherein the nutrient medium contains a member of the group consisting of ammonia, ammonium hydroxide, and ammonium salts.

References Cited in the file of this patent

UNITED STATES PATENTS

| Number | Name | Date |
|---|---|---|
| 1,893,819 | Currie | Jan. 10, 1933 |
| 2,006,086 | May | June 25, 1935 |
| 2,132,712 | Ward | Oct. 11, 1938 |
| 2,370,961 | Hollander | Mar. 6, 1945 |
| 2,438,136 | Szucs | Mar. 23, 1948 |

OTHER REFERENCES

Styer: Am. J. Botany, vol. 17, pp. 983–994 (December 1930).

Matlin: "Growing Plants Without Soil," 2d ed., pub. 1940, pp. 35 and 37.

Treschow: Dansk Botanisk Arkiv, vol. 11, No. 6, pp. 23–37, 163–166, 179 (1944).

Burkholder: Am. J. Botany, vol. 32, pp. 424–431 (July 1945).